US006676017B1

(12) United States Patent
Smith, III

(10) Patent No.: US 6,676,017 B1
(45) Date of Patent: Jan. 13, 2004

(54) PERSONAL INTERFACE DEVICE AND METHOD

(76) Inventor: Emmitt J. Smith, III, 15001 Winnwood, Dallas, TX (US) 75254

( * ) Notice: Subject to any disclaimer, the term of this patent is extended or adjusted under 35 U.S.C. 154(b) by 0 days.

(21) Appl. No.: 10/289,066

(22) Filed: Nov. 6, 2002

(51) Int. Cl.$^7$ .................................................. G06K 5/00
(52) U.S. Cl. ....................... 235/380; 239/379; 239/382; 239/382.5; 239/492; 705/72; 705/73; 705/74; 705/75
(58) Field of Search ................................. 235/379, 380, 235/382, 382.5; 705/72, 73, 74, 75, 1, 17, 18, 40, 41, 44, 411, 64, 55, 67

(56) References Cited

U.S. PATENT DOCUMENTS

| | | | | |
|---|---|---|---|---|
| 2,292,387 | A | | 8/1942 | Markey et al. ................ 250/2 |
| 4,277,837 | A | * | 7/1981 | Stuckert ..................... 235/380 |
| 4,386,266 | A | * | 5/1983 | Chesarek .................... 705/72 |
| 4,529,870 | A | * | 7/1985 | Chaum ....................... 235/380 |
| 4,689,478 | A | * | 8/1987 | Hale et al. .................. 235/380 |
| 5,267,315 | A | * | 11/1993 | Narita et al. ................ 705/67 |
| 5,276,311 | A | | 1/1994 | Hennige ..................... 235/380 |
| 5,436,970 | A | * | 7/1995 | Ray et al. ................... 713/186 |
| 5,578,808 | A | * | 11/1996 | Taylor ....................... 235/380 |
| 5,585,787 | A | | 12/1996 | Wallerstein ............ 340/825.34 |
| 5,770,843 | A | * | 6/1998 | Rose et al. ................. 235/380 |
| 5,825,302 | A | | 10/1998 | Stafford ................. 340/870.01 |
| 6,070,141 | A | * | 5/2000 | Houvener et al. ............. 705/1 |
| 6,112,984 | A | * | 9/2000 | Snavely ..................... 235/379 |
| 6,131,811 | A | | 10/2000 | Gangi ....................... 235/380 |
| 6,148,091 | A | * | 11/2000 | DiMaria .................... 382/115 |
| 6,149,055 | A | * | 11/2000 | Gatto ....................... 235/379 |
| 6,224,109 | B1 | * | 5/2001 | Yang ......................... 283/77 |
| 6,305,603 | B1 | * | 10/2001 | Grunbok et al. ............ 235/379 |
| 6,402,029 | B1 | | 6/2002 | Gangi ....................... 235/380 |
| 6,431,439 | B1 | * | 8/2002 | Suer et al. ................. 235/380 |
| 6,494,367 | B1 | * | 12/2002 | Zacharias ................... 235/382 |
| 2002/0052193 | A1 | | 5/2002 | Chetty ....................... 455/412 |
| 2002/0073044 | A1 | | 6/2002 | Singhal ...................... 705/64 |

FOREIGN PATENT DOCUMENTS

JP          2002189971 A    *  7/2002    ........... G06F/17/60

* cited by examiner

Primary Examiner—Michael G. Lee
Assistant Examiner—Daniel Walsh
(74) Attorney, Agent, or Firm—Christopher J. Rourk; Akin Gump Strauss Hauer & Feld, LLP

(57) ABSTRACT

A personal device is provided. The personal device includes an identification verification system that receives first identification data from a physical identification device, such as by inserting a driver's license into a card reader that is adapted to receive a driver's license. Second identification data such as a PIN number is also received. Payment authorization data or other suitable data is generated if the driver's license corresponds to the PIN. A payment selection system or other suitable system receives the payment authorization data and displays one or more payment accounts for selection by a user. Where a payment selection system is used, the payment selection system transmits payment account data to a point-of-sale system.

1 Claim, 4 Drawing Sheets

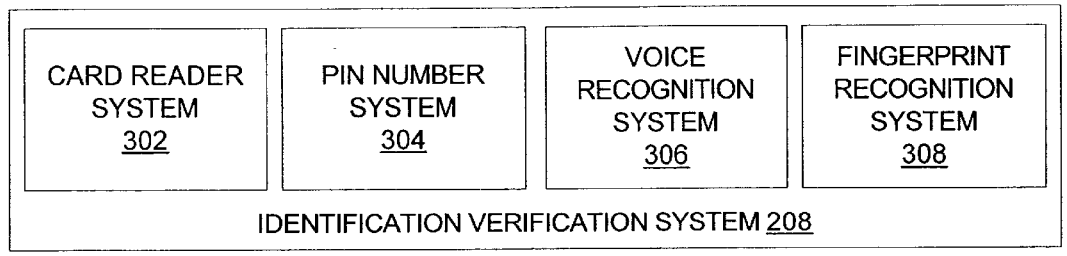
300 ↑ FIGURE 3
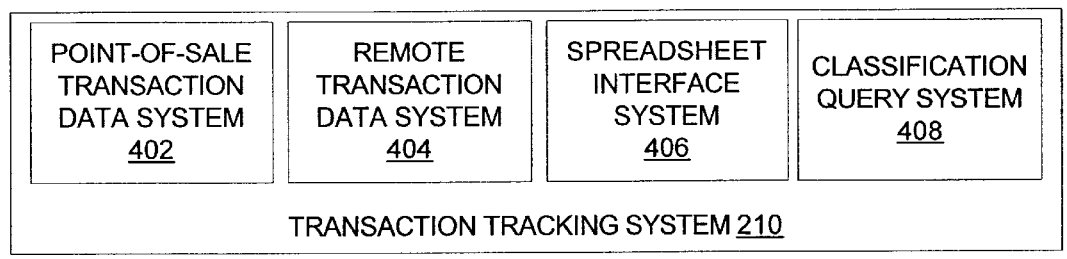
400 ↑ FIGURE 4
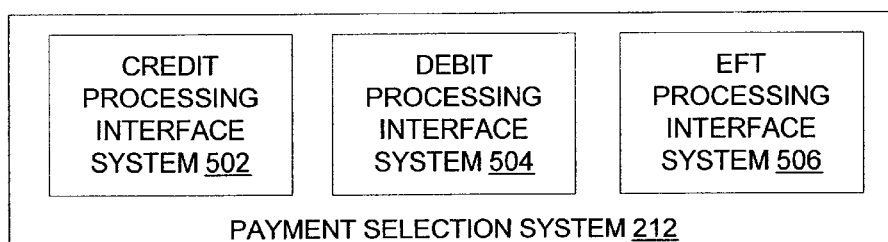
500 ↑ FIGURE 5
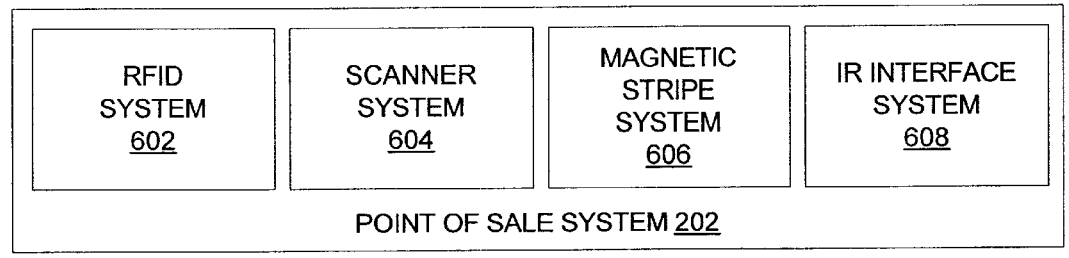
600 ↑ FIGURE 6

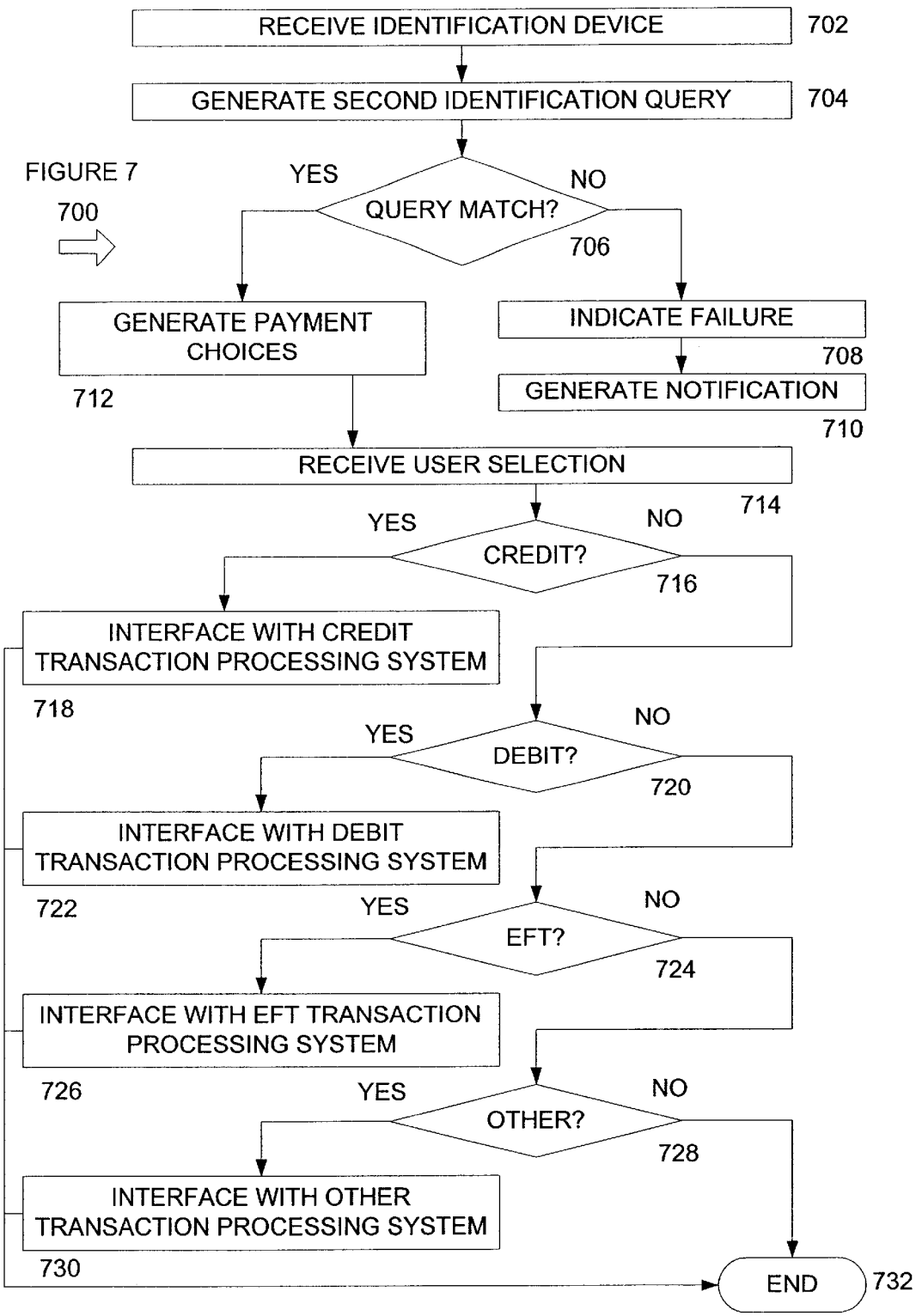

PERSONAL INTERFACE DEVICE AND METHOD

FIELD OF THE INVENTION

The present invention pertains to the field of personal interface devices, and more particularly to a personal interface device with improved security.

BACKGROUND OF THE DISCLOSURE

Personal devices are known that allow a user to store data in the device for the purpose of providing the data to external systems. For example, such personal devices include credit card consolidators that store multiple credit card numbers, and that allow a user to select one of the credit cards for making payment at a point of sale. A magnetic stripe emulator is used by such devices to provide the selected credit card number to a magnetic stripe reader.

While such devices allow multiple credit card numbers and related information to be stored, they present an increased risk from theft of the device, because they allow an unauthorized user can still bypass security measures. For example, if a PIN number is required by the device, an unauthorized user would be able to try various PIN numbers until one was found that worked. Such devices also provide limited additional functionality.

SUMMARY OF THE INVENTION

In accordance with the present invention, a personal interface device and system for using the personal interface device are provided that overcome known problems with personal interface devices.

In particular, a personal interface device is provided that allows a personal identification device such as a driver's license to be used with the personal interface device.

In accordance with an exemplary embodiment of the present invention, a personal device is provided. The personal device includes an identification verification system that receives first identification data from a physical identification device, such as by inserting a driver's license into a card reader that is adapted to receive a driver's license. Second identification data such as a PIN number is also received. Payment authorization data or other suitable data is generated if the driver's license corresponds to the PIN. A payment selection system or other suitable system receives the payment authorization data and displays one or more payment accounts for selection by a user. Where a payment selection system is used, the payment selection system transmits payment account data to a point-of-sale system.

The present invention provides many important technical advantages. One important technical advantage of the present invention is a personal device that requires two types of identification to operate, including a physical identification device such as a driver's license that can be used to verify the identity of the user. The present invention thus helps to prevent fraud.

Those skilled in the art will further appreciate the advantages and superior features of the invention together with other important aspects thereof on reading the detailed description that follows in conjunction with the drawings.

BRIEF DESCRIPTION OF THE DRAWINGS

FIG. 3 is a diagram of a system for performing identification verification in accordance with an exemplary embodiment of the present invention;

FIG. 4 is a diagram of a system for transaction tracking in accordance with an exemplary embodiment of the present invention;

FIG. 5 is a diagram of a system for selecting payment accounts in accordance with an exemplary embodiment of the present invention;

FIG. 6 is a diagram of a system for a point of sale interface with a payment device in accordance with an exemplary embodiment of the present invention;

FIG. 7 is a flowchart of a method for controlling payment from a personal device in accordance with an exemplary embodiment of the present invention.

DETAILED DESCRIPTION OF PREFERRED EMBODIMENTS

Figure 1:
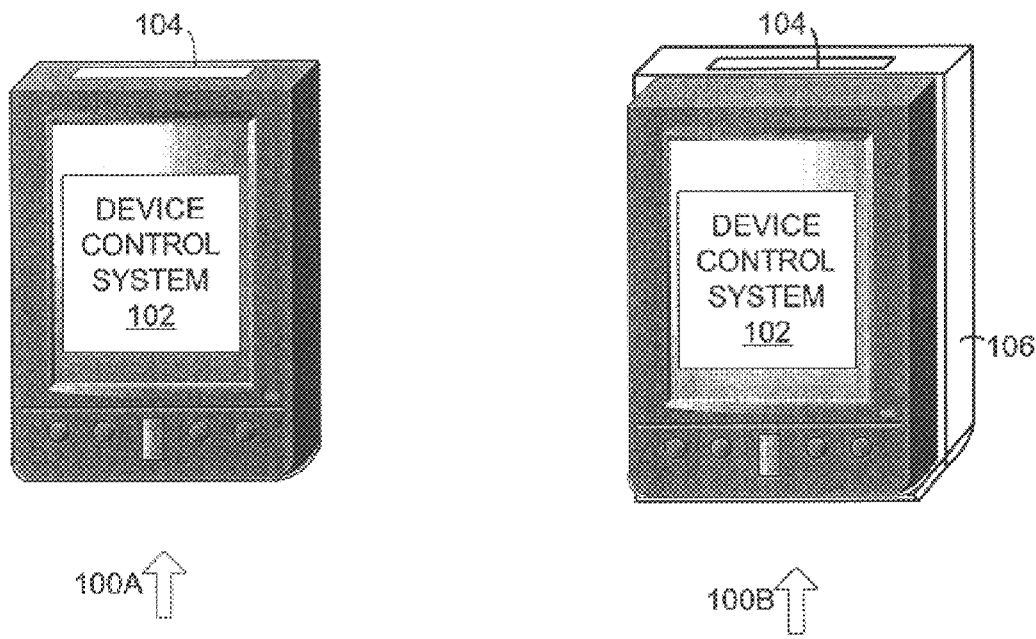
FIG. 1 is a diagram of personal devices for controlling payment in accordance with an exemplary embodiment of the present invention.

In the description that follows, like parts are marked throughout the specification and drawings with the same reference numerals, respectively. The drawing figures might not be to scale, and certain components can be shown in generalized or schematic form and identified by commercial designations in the interest of clarity and conciseness.

FIG. 1 is a diagram of personal devices 100A and 100B for controlling payment in accordance with an exemplary embodiment of the present invention. Personal devices 100A and 100B allow a user to control a plurality of payment accounts from a single device while maintaining high levels of security over unauthorized use of the device.

Personal devices 100A and 100B include device control system 102. Personal devices 100A and 100B can each be a personal digital assistant, a palmtop computer, a handheld computer, a cell phone, or other suitable devices. Device control system 102 can be implemented in hardware, software, or a suitable combination of hardware and software, and can be one or more hardware systems, or one or more software systems operating on a suitable processing platform. As used herein, a hardware system can include discrete semiconductor devices, an application-specific integrated circuit, a field programmable gate array or other suitable devices. A software system can include one or more objects, agents, threads, lines of code, subroutines, separate software applications, user-readable (source) code, machine-readable (object) code, two or more lines of code in two or more corresponding software applications, databases, or other suitable software architectures. In one exemplary embodiment, a software system can include one or more lines of code in a general purpose software application, such as an operating system, and one or more lines of code in a specific purpose software application.

Personal devices 100A and 100B include an identification device slot 104. In one exemplary embodiment, as shown on personal device 100A, the identification device slot 104 is incorporated into the housing of the personal device 100A. In another exemplary embodiment, a cradle 106 or other suitable devices can be used to provide the identification device slot 104 for use in conjunction with personal device 100B. In this exemplary embodiment, a user can carry cradle 106 as an integral part of personal device 100B, such as where cradle 106 is a wireless device, a protective device, or serves other purposes. In another exemplary embodiment, cradle 106 can be provided at a point of sale, and can be activated in conjunction with personal device 100B when a purchase is made, such that the user provides the identification device to identification device slot 104 and places personal device 100b in cradle 106 in order to proceed with the transaction.

Payment control system 192 allows the user to select one or more payment accounts for payment of a transaction. In one exemplary embodiment, the user inserts the identification device into identification device slot 104, and device control system 102 then generates a query for the user. The query can include a request to enter a PIN number or other suitable second identification data. In this manner, device control system 102 determines whether the first identification data from the identification device in identification device slot 104 corresponds to the identification data entered by the user in response to the query or in other suitable manners. Thus, if the personal device 100A or 100B is lost or misappropriated, it cannot be used to generate or transmit payment data without both of the personal device and knowledge of the user's second identification data.

In operation, a user takes personal device 100A or 100B to a store and initiates a purchase transaction. To provide payment data, the user then inserts an identification device into identification device slot 104 and enters second identification data in response to a query or other prompt from device control system 102. After device control system 102 determines that the identification device corresponds to the second identification data, device control system 102 provides the payment data. For example, the payment data can include credit card data, debit card data, electronic funds transfer data, or other suitable data that is used to purchase the desired goods or services. Personal device 100A or 100B can provide the payment data to a point of sale terminal, through a wireless or wireline network or other suitable networks or communications media to a central controller, or in other suitable manners. Likewise, three or more types of identification data or additional identification devices can be used to augment security.

Figure 2:
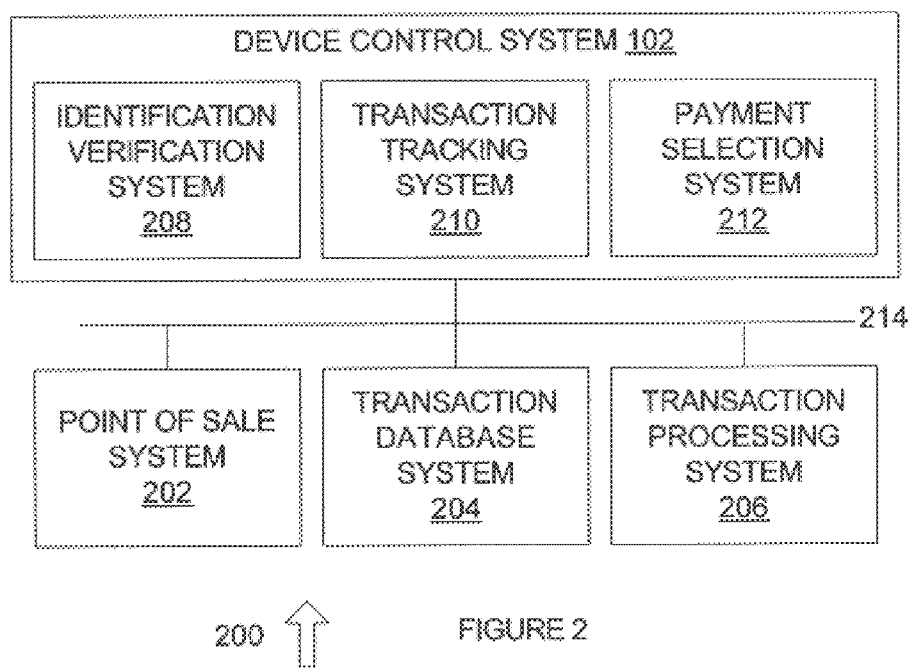
FIG. 2 is a diagram of a system using a personal device in accordance with an exemplary embodiment of the present invention.

FIG. 2 is a diagram of a system 200 using a personal device in accordance with an exemplary embodiment of the present invention. System.200 allows payment data to be provided from a personal device, and further allows transaction data to be stored and compiled in a personal device for tracking of transaction data and other purposes.

System 200 includes device control system 102 and point of sale system 202, transaction database system 204, transaction processing system 206, identification verification system 208, transaction tracking system 210, and payment selection system 212, each of which can be implemented in hardware, software or a suitable combination of hardware and software, and which can be one or more software systems operating on a suitable processing platform. For example, point of sale system 202, transaction database system 204, and transaction processing system 206 can be implemented on a general purpose processing platform, general purpose server platform, mainframe platform, a workstation, or other suitable platforms, whereas device control system 102 can be implemented on a personal device such as a personal digital assistant, palmtop computer, cell phone, or other suitable devices.

Identification verification system 208 receives identification data from two or more sources and determines whether the identification data from a first source corresponds with the identification data from one or more of the other sources. In one exemplary embodiment, identification verification system 208 can generate queries or prompts for a user to provide identification data. Likewise, identification verification system 208 can require a user to know a predetermined sequence of events, such that the failure of the user to use the required sequence of events constitutes a failure of identification. Other suitable processes can also or alternatively be used.

Transaction tracking system 210 performs transaction tracking and storage. In one exemplary embodiment, transaction tracking system 210 interfaces with the point of sale device or other suitable systems and obtains transaction data, such as item identification data from bar codes, or other suitable data. Likewise, transaction tracking system 210 can include a bar code reader or other suitable devices that allow a user to scan individual packages or goods. Transaction tracking system 210 can also prompt a user to enter data for a transaction, such as identifying a cost center for the transaction to be associated with, an activity, or other suitable transaction tracking data.

Payment selection system 212 generates one or more payment account identifiers and allows a user to select one or more of the payment account identifiers. Payment selection system 212 then interfaces with external payment processing systems, such as credit card systems, debit card systems, electronic fund transfer systems, or other suitable systems. In one exemplary embodiment, payment selection system 212 generates icons or other identifiers that do not explicitly identify the payment account in a manner that would be intuitively obvious to a third party that is not familiar with a user's personal device 100A or 100B.

Communications medium 214 is coupled to one or more systems of system 200. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. In one exemplary embodiment, systems and components are coupled to other systems and components through intervening systems and components, such as through an operating system. Communications medium 214 can be a local area network, a wide area network, a public network such as the Internet, the public switched telephone network, a wireless network, a fiber optic network, other suitable media, or a suitable combination of such media.

Point of sale system 202 performs purchase transaction processing at a retail location or other suitable locations. In one exemplary embodiment, point of sale system 202 can include a laser bar code scanner, a radio frequency ID tag system, a manual entry terminal, or other suitable point of sale devices. Point of sale system 202 can include bluetooth or other wireless networking capabilities so that wireless connectivity with a personal device 100A or 100B can be provided. Point of sale system 202 can also interface with transaction database system 204 and transaction processing system 206, such as to provide a list of items that have been purchased for subsequent download to a personal device and associated data, such as item cost.

Transaction database system 204 receives transaction data from point of sale system 202 and provides the transaction data to device control system 102 and other related systems.

In one exemplary embodiment, transaction database system 204 can receive the transaction data from a point of sale system 202 and can associate the transaction data with the payment account, with a user account, or with other suitable data so that a user can access transaction database system 204 and receive the transaction data. In this exemplary embodiment, a point of sale system 202 might not be configured to interface directly with a device control system 102 or other suitable systems, such that an intermediary system operated by a third party is required. Likewise, transaction database system 204 can interface with device control system 102 and other suitable systems using a wireless communications media, such as where transaction database system 204 is operated in a single location by a retail facility and communicates using a local wireless network or other suitable communications media with device control system 102 and other suitable systems.

Transaction processing system 206 receives payment data and provides payment authorization data. In one exemplary embodiment, transaction processing system 206 can interface with a personal device 100A or 100B over a wireless network or other suitable networks, and after receiving payment authorization can transmit the payment approval data or other suitable data to point of sale system 202. Transaction processing system 206 can then receive the transaction data, itemization data, cost data, or other suitable data from point of sale system 202 and can provide the purchase data to device control system 102 or other suitable systems. Likewise, transaction processing system 206 can provide store identification data, time of day identification data, geographical data, or other suitable data. The transaction data can also be provided by point of sale system 202, transaction database system 204, or other suitable systems.

In operation, a user with a personal device 100A or 100B or other suitable personal devices enters a facility to make a purchase transaction. After identification has been verified and a payment account has been selected, point of sale system 202 authorizes the transaction and then transmits transaction data to transaction tracking system 210, either directly, through transaction database system 204, transaction processing system 206, or other suitable systems or processes. In this manner, the user can select not only which payment account to use for a purchase transaction, but can also receive data for that purchase transaction that allows the user to track and otherwise manage the purchase transaction, such as by using a spreadsheet program or other suitable systems or methods.

FIG. 3 is a diagram of a system 300 for performing identification verification in accordance with an exemplary embodiment of the present invention. System 300 includes identification verification system 208 and card reader system 302, PIN number system 304, voice recognition system 306, and thumbprint recognition system 308, each of which can be implemented in hardware, software, or a suitable combination of hardware and software, and which can be one or more software systems operating on a handheld device or other suitable processing platforms.

Card reader system 302 reads identification card data and provides the identification card data to other suitable systems. In one exemplary embodiment, card reader system 302 can be configured to read identification card data, as opposed to credit card data or other suitable data, such as where the identification card has unique data patterns or input/output devices that prevent a normal card reader from being used. Likewise, card reader system 302 can read optical data, radio frequency data, or other suitable data.

Pin number system 304 generates a prompt and receives personal identification number data in response to the prompt. In one exemplary embodiment, PIN number system 304 can generate a non-intuitive prompt, such that an unauthorized operator of the identification verification system 208 or other suitable systems is not alerted that a PIN number is required. In this manner, an unauthorized user would not be alerted to try and guess a PIN number. Other suitable processes or methods can also or alternatively be used.

Voice recognition system 306 generates suitable user prompts or indications and receives user voice data. In one exemplary embodiment, voice recognition system 306 can instruct a user to read a phrase or statement, can prompt the user to proceed without any additional specificity on the type of data requested, or can perform other suitable functions. When the user speaks, voice recognition system 306 generates speech data that can be analyzed to identify the speaker.

Fingerprint recognition system 308 generates suitable user prompts or indications and receives user thumbprint data. In one exemplary embodiment, fingerprint recognition system 308 can instruct a user to place their thumb or other fingers on a predetermined location of a fingerprint reader or can perform other suitable functions. When the user provides the fingerprint, fingerprint recognition system 308 generates fingerprint data that can be analyzed to identify the user.

In operation, system 300 allows identification at a personal device to be performed. System 300 allows two or more forms of identification to be used to increase the reliability of the identification and to decrease the capacity for fraud or other unauthorized activities.

FIG. 4 is a diagram of a system 400 for transaction tracking in accordance with an exemplary embodiment of the present invention. System 400 includes transaction tracking system 210 and point of sale transaction data system 402, remote transaction data system 404, spreadsheet interface system 406, and classification query system 408, each of which can be implemented in hardware, software, or a suitable combination of hardware and software, and which can be one or more software systems operating on a general purpose processing platform.

Point of sale transaction data system 402 receives point of sale transaction data and provides the point of sale transaction data on demand. In one exemplary embodiment, point of sale transaction data system 402 can use a data port, infrared port, cradle, or other suitable devices to interface with a point of sale device, can receive the transaction data from the point of sale device at the end of the purchase transaction or as it is being generated, and can independently obtain point-of-sale data, such as through the use of a bar code scanner, RFID scanner, or other device attached to personal device 100A or 100B, where the user can scan each item before it is processed by point of sale system 202 or other suitable systems. In another exemplary embodiment, point of sale transaction data system 402 can interface through a wireless network or other suitable connections to a point of sale system, can communicate with a point of sale system over a public switched telephone network (PSTN) including a wireless network or other suitable combinations of communications media, or in other suitable manners. In another exemplary embodiment, point of sale transaction data system 402 can generate a bar code, a magnetic stripe code, a radio frequency code, or other suitable codes, which can be read by a point of sale system and used to index transaction data to allow the transaction data to be retrieved from a database.

Remote transaction data system 404 interfaces with a remote transaction database, such as that operated by transaction database system 204, transaction processing system 206, or other suitable systems, and receives transaction data from such remote data transaction databases. In one exemplary embodiment, remote transaction data system 404 can interface with a transaction processing system 206 as part of payment authorization, such that transaction processing system 206 receives the transaction data from the point of sale system to after transmitting the payment authorization data to the point of sale system. Likewise, other suitable processes or systems can also or alternatively be used.

Spreadsheet interface system 406 allows transaction data stored on a personal device or other suitable systems or devices to be provided to a spreadsheet program, such as one on the personal device, a personal computer, a desktop computer, a laptop computer, or other suitable spreadsheet programs or systems. In one exemplary embodiment, spreadsheet interface system 406 can convert between a PALM database or other suitable database structures to a database structure compatible with one or more spreadsheet systems. Spreadsheet interface system 406 can also update status data of a device control system 102 or other suitable systems such as to show that a set of data has been synchronized with a main database or other suitable data.

Classification query system 408 queries a user to enter a classification for transaction data, such as to classify stores, products, dates, or other suitable data for tax purposes, for expense reports, for budgeting, or for other suitable purposes. In one exemplary embodiment, the transaction classification query can be submitted after a transaction in which classification data can not be extracted from the transaction data, such as where a new type of product has been purchased, a product is purchased from a new location, or other suitable data. Likewise, classification query system 408 can be used to query a user after a transaction to enter a transaction identifier, so that the transaction data can later be obtained from a transaction database system 204 or other remote systems storing the transaction data in a manner that allows it to be cross-referenced by the transaction identifier.

In operation, system 400 is used for transaction tracking. Transaction data can be received from a point of sale system, through a remote system, or in other suitable manners, and can be configured for use with a spreadsheet system or other suitable systems. Likewise, additional queries can be generated when transaction data is received, such as to require the user to enter predetermined data to help track the transaction data.

FIG. 5 is a diagram of a system 500 for selecting payment accounts in accordance with an exemplary embodiment of the present invention. System 500 includes payment selection system 212 and credit processing interface system 502, debit processing interface system 504, and electronic funds transfer (EFT) processing interface system 506, each of which can be implemented in hardware, software, or a suitable combination of hardware and software, and which can be one or more software systems operating on a suitable processing platform.

Credit processing interface system 502 generates a user prompt, an icon, or other suitable data that allows a user to select a credit account. In one exemplary embodiment, credit processing interface system 502 can store two or more types of credit card data, and can use a unique identifier for each account type. Credit processing interface system 502 can further interface with a credit transaction processing facility, such as by transmitting the credit data in a predetermined format, by providing the credit data to a point of sale terminal that then assembles the credit data for transmission, or in other suitable manners.

Debit processing interface system 504 generates a user prompt, an icon, or other suitable data that allows a user to select a debit card account. In one exemplary embodiment, debit processing interface system 504 can store two or more types of debit card data, and can use a unique identifier for each account type. Debit processing interface system 504 can further interface with a debit transaction processing facility, such as by transmitting the debit card data in a predetermined format, by providing the debit card data to a point of sale terminal that then assembles the debit card data for transmission, or in other suitable manners.

EFT processing interface system 506 generates a user prompt, an icon, or other suitable data that allows a user to initiate an EFT transaction. In one exemplary embodiment, EFT processing interface system 506 can store two or more types of EFT account data, and can use a unique identifier for each account type. EFT processing interface system 506 can further interface with an EFT transaction processing facility, such as by transmitting the EFT account data in a predetermined format, by providing the EFT account data to a point of sale terminal that then assembles the data for transmission, or in other suitable manners.

In operation, system 500 allows a user to select one or more types of payment accounts for use in conjunction with authorizing payment using a personal device. System 500 thus allows users to consolidate one or more payment accounts in a single device, such as for use in conjunction with two or more types of identification data to prevent inadvertent use of the device or unauthorized use of the device.

FIG. 6 is a diagram of a system 600 for a point of sale interface with a payment device in accordance with an exemplary embodiment of the present invention. System 600 includes point of sale system 202 and RFID system 602, scanner system 604, magnetic stripe system 606, and IR interface system 608, each of which can be implemented in hardware, software, or a suitable combination of hardware and software, and which can be one or more software systems operating on a suitable processing platform.

RFID system 602 receives radio frequency tag data and provides the radio frequency tag data to device control system 102 or other suitable systems. In one exemplary embodiment, device control system 102 can include a radio frequency tag or other suitable devices that allow it to be used in conjunction with a radio frequency point of sale system. In this exemplary embodiment, a shopper can carry items having a radio frequency tag or place them into a shopping basket, and the items can be charged to the shopper when the shopper exits the store or enters an exit staging area. Device control system 102 can receive item data, transaction data, and other suitable data that has been compiled by a radio frequency tag point of sale system, such as one that scans a buyer or their shopping cart to determine the contents based on radio frequency tags, or other suitable systems. The item data, transaction data, or other suitable data can be provided to device control system 102 directly, through a wireless connection, by interfacing with a remote database, or in other suitable manners.

Scanner system 604 receives scanned bar code data or other suitable data and provides the scanned data to device control system 102 or other suitable systems. In one exemplary embodiment, device control system 102 can generate a bar code or other scannable data that allows it to be used in conjunction with a bar code scanner point of sale system. In this exemplary embodiment, a shopper can scan the bar code generated by device control system 102 so as to allow the transaction data, item data, or other data to be associated with device control system 102 in a manner that allows the data to be retrieved from a remote database. Automatic reconciliation of the data read by scanner system 604 with data received from RFID system 602 can also be performed, such as to notify the user of any discrepancies between what the user scanned and what has been charged to the user by RFID system 602.

Magnetic stripe system 606 receives magnetic stripe data or other suitable data and provides the magnetic stripe data to device control system 102 or other suitable systems. In one exemplary embodiment, device control system 102 can generate magnetic stripe data or other data that allows it to be used in conjunction with a magnetic stripe reader point of sale system. In this exemplary embodiment, a shopper can scan the magnetic stripe generated by device control system 102 so as to allow the transaction data, item data, or other data to be associated with device control system 102 in a manner that allows the data to be retrieved from a remote database.

IR interface system 608 interfaces with infrared signaling devices. In one exemplary embodiment, IR interface system 608 can receive and transmit infrared signals that carry encoded data, such as to communicate with an IR port of personal device 100A or 100B. In this exemplary embodiment, a user can receive transaction data, item data, or other suitable data through IR data communications.

In operation, system 600 allows a point of sale device to be used in conjunction with a device control system 102 or other suitable systems, so as to allow item data, transaction data, or other suitable data to be provided to the purchaser in a manner that allows the purchaser to select a type of payment, track purchases, and perform other useful functions.

FIG. 7 is a flowchart of a method 700 for controlling payment from a personal device in accordance with an exemplary embodiment of the present invention. Method 700 begins at 702 where an identification device is received. In one exemplary embodiment, the identification device can be a driver's license or other suitable devices that are inserted into a card reader or other suitable interfaces. Likewise, the identification device can be a device that is wirelessly coupled, can be a speech identification device or other suitable devices that receive identification data. The method then proceeds to 704.

At 704, a second identification query is generated. In one exemplary embodiment, the second identification query can include a query to enter a PIN number, to state a phrase, or other suitable queries. Likewise, the query can be a nonintuitive query, such as a query that a user can respond to only if the user is aware that a response is required. A third query and subsequent queries or other additional forms of identification can also be generated. The method then proceeds to 706.

At 706 it is determined whether there is a query match with the identification device data. In one exemplary embodiment, a timeout can also be performed, such as where an explicit query is not provided and a suitable response is not received within a predetermined time. The query match can include data in response to the query that is not contained on the identification device, such as a PIN number, password, or other suitable identification data. If it is determined that a query match has not occurred the method proceeds to 708, where failure is indicated. The method can then proceed 710 where a notification is generated, such as where a predetermined number of unacceptable query matches has occurred, such as to notify appropriate authorities, suspend payment account authorization activities from the personal device, or for other suitable purposes.

If it is determined at 706 that a query match has occurred, the method proceeds to 712 where payment choices are generated. In one exemplary embodiment, the payment choices can include icons or other indicators that represent one or more credit card accounts, debit accounts, electronic fund transfer accounts, or other suitable payment choices. The method then proceeds to 714.

At 714 a user selection is received, such as by selecting an icon, entering a key number, or other suitable user selections. The method then proceeds to 716 where it is determined whether the user selection was to perform a credit transaction. If it is determined at 716 that a credit transaction is not selected the method proceeds to 720, otherwise the method proceeds to 718 where the personal device interfaces with a credit transaction processing system and provides the credit account data. In one exemplary embodiment, the personal device can access the credit transaction processing system through a cradle at the point of sale terminal, such as by inserting the personal device into the cradle. In another exemplary embodiment, the credit transaction processing system can be reached over a wireless connection, such as through a wireless network, through a local wireless network to a public switch telecommunications network, or in other suitable manners. After credit data has been transmitted and credit transaction processing has been authorized, the method proceeds to 732 and terminates.

At 720 it is determined whether a debit transaction has been selected. If a debit transaction has not been selected the method proceeds to 724, otherwise the method proceeds to 722.

At 722, the personal device interfaces with a debit transaction processing system and provides the debit account data. The interface with the debit transaction processing system can be over a wire line connection, a wireless connection, or in other suitable manners. Likewise, the interface with the debit transaction processing system can include prompting the user to enter a PIN number associated with a debit card or other suitable data. After completion of debit transaction processing the method proceeds to 732 and terminates.

At 724 it is determined whether an electronic funds transfer has been indicated. If an electronic funds transfer has not been indicated the method proceeds to 728. Otherwise the method proceeds to 726 where the personal device interfaces with an electronic funds transfer transaction processing system and provides electronic funds transfer data. In one exemplary embodiment, the electronic funds transfer transaction processing system can receive one or more account numbers, passwords, PIN numbers, or other suitable data. After completion of the electronic funds transfer transaction the method proceeds to 732 and terminates.

At 728 it is determined whether other suitable payment accounts have been selected, such as a stored value payment account. If no other payment account has been selected the method proceeds to 732 and terminates, such as after a time out period. If an account has been selected the method proceeds to 730 where the personal device interfaces with other suitable transaction processing systems and provides suitable data. After completion of the transaction authorization the method proceeds to 732 and terminates.

In operation, method 700 allows a user to consolidate one or more payment accounts into a single personal device such that any of the payment accounts can be selected to purchase goods or services. Method 700 thus allows a user to securely consolidate payment account devices such as credit cards, debit cards, checkbooks, or other suitable payment devices and further allows a payment account to be selected based on the type of transaction, the retail location, a physical location, or other suitable data.

Figure 8:
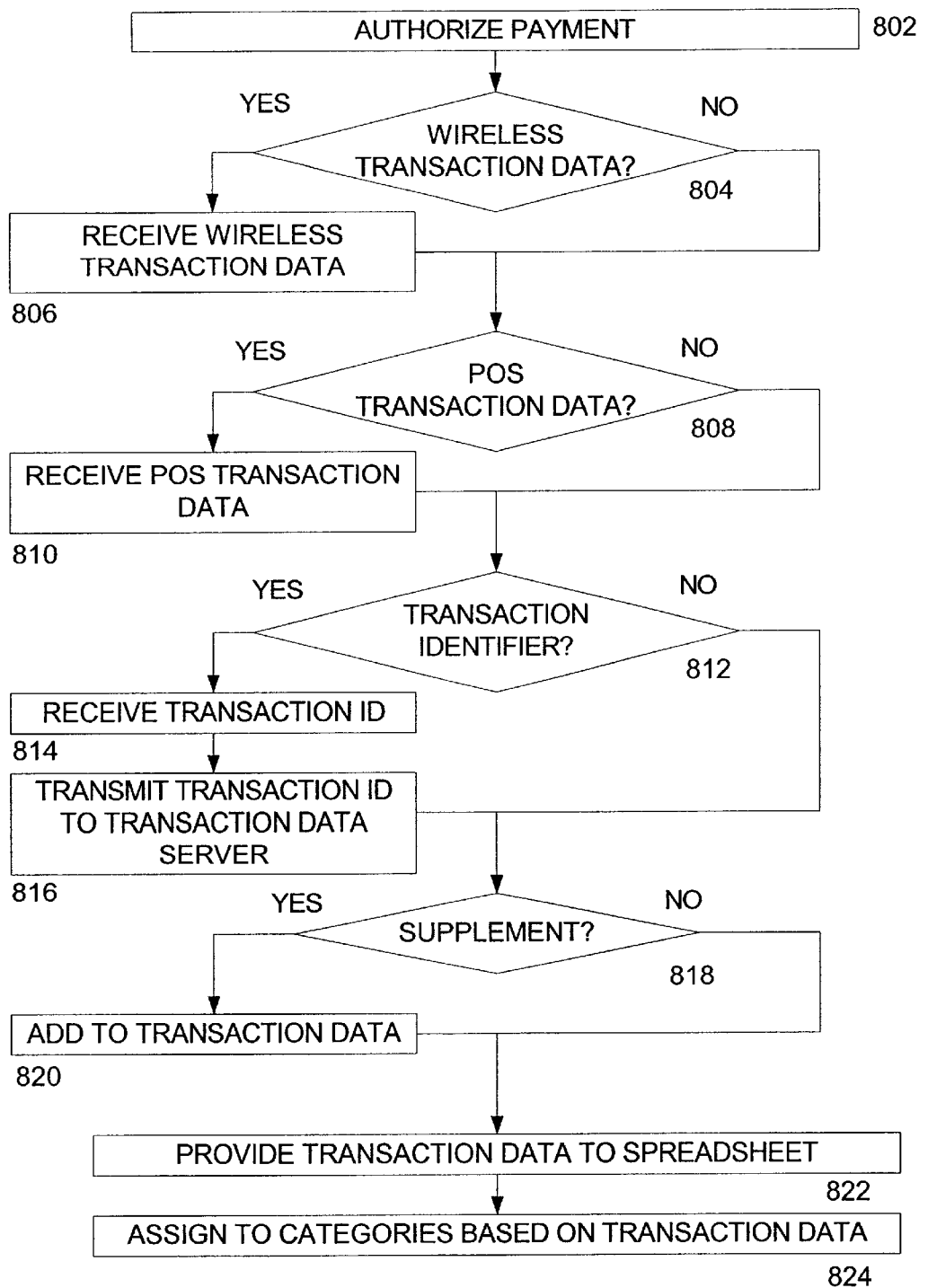
FIG. 8 is a flow chart of method for providing transaction data to a user in accordance with an exemplary embodiment of the present invention.

FIG. 8 is a flow chart of method 800 for providing transaction data to a user in accordance with an exemplary embodiment of the present invention. Method 800 begins at 802 where payment is authorized. In one exemplary embodiment, payment can be authorized through a personal device, or in other suitable manners. The method then proceeds to 804.

At 804 it is determined whether wireless transaction data is available. In one exemplary embodiment, the wireless transaction data can be obtained in conjunction with a wireless connection to a payment authorization system, such as over a local wireless network, a wireless public telecommunications network, or other suitable media or combinations of media. If it is determined at 804 that wireless transaction data is not available the method proceeds to 808. Otherwise the method proceeds to 806 where wireless transaction data is received. In one exemplary embodiment, the wireless transaction data can be received over a bluetooth or other local wireless network connection, such as from the point of sale system, from a centralized store system that communications with personal devices, from a radio frequency tag system, or other suitable systems. In another exemplary embodiment, the PSTN, a wireless telephone network, an RFID system, or other suitable communications media can be used to receive the transaction data. The method then proceeds to 808.

At 808 it is determined whether point of sale transaction data is available. In one exemplary embodiment, a personal device can be placed in a cradle, connected via an infrared data connection, a wireless network, an RFID system, or otherwise connected to a point of sale system and transaction data can be provided to the personal device through the point of sale system. In another exemplary embodiment, a wireless protocol or other suitable processes can be used. If it is determined that point of sale transaction data is not available the method proceeds to 812. Otherwise the method proceeds to 810 where point of sale transaction data is received, such as through a data port, a data bus, or other suitable devices or processes. The method then proceeds to 812.

At 812 it is determined whether a transaction identifier is being provided. In one exemplary embodiment, a transaction identifier can be provided in systems that do not allow the personal device to connect wirelessly or physically with a different system, but where the user can interface with a transaction database system or other suitable systems, such as after interfacing with a personal computer on a desktop. In this exemplary embodiment, the transaction identifier can be provided to a bar code reader, a magnetic stripe scanner, entered manually, or provided in other suitable manners so as to allow the user to obtain the transaction data, such as an itemized bill and identification of purchases, from the remote transaction database. If it is determined that the transaction identifier is not provided at 812 the method proceeds to 818, otherwise the method proceeds to 814 where a transaction ID is received. In one exemplary embodiment, the transaction ID can be received through a personal device cradle or other physical interface, through a wireless connection, by keying in or manually entering the data, or in other suitable manners. The method then proceeds to 816 where the transaction ID is transmitted to the transaction data server. The transaction ID can be transmitted to the transaction data server over a wireless connection of the personal device on a time deferred basis to optimize network use, can be transmitted to a desktop computer after a user interfaces the personal device with the desktop computer, or other suitable processes can be used. The method then proceeds to 818.

At 818 it is determined whether the transaction data needs to be supplemented, such as by generating a user prompt or in other suitable manners. In one exemplary embodiment, a prompt can be generated when transaction data is received, such as to identify a class of expenses to assign the transaction data to, to classify items that have not been previously classified, or for other suitable purposes. If it is determined that supplementing is not required, the method proceeds to 822, otherwise the method proceeds to 820 where the transaction data is supplemented. The method then proceeds to 822.

At 822 the transaction data is provided to a spreadsheet program or system or other suitable systems. In one exemplary embodiment, transaction data can be provided to a spreadsheet system after the personal device interfaces with a desktop computer or other suitable systems. The method then proceeds to 824.

At 824 the transaction data is assigned to categories. In one exemplary embodiment, the categories can include business categories, expense categories, location categories, time categories, purchased goods categories, or other suitable categories.

In operation, method 800 allows transaction data to be received in a personal device such as a PDA, a palm-top computer, a cell phone, or other suitable devices, such as when a transaction is performed or goods or services are purchased. In this manner, tracking of expenses and other data, such as for expense reports, tax purposes, or other suitable purposes, can be performed.

Although exemplary embodiments of a system and method of the present invention have been described in detail herein, those skilled in the art will also recognize that various substitutions and modifications can be made to the systems and methods without departing from the scope and spirit of the appended claims.

What is claimed is:

1. A system for controlling payment from a personal device comprising:

an identification verification system receiving first identification data from a physical identification device and second identification data and generating payment authorization data if the first identification data corresponds to the second identification data, the identification system further comprising:

a card reader system reading identification card data, wherein the identification card data is not associated with the one or more payment accounts;

a PIN number system generating a PIN number prompt and receiving PIN number data; and a voice recognition system generating a voice recognition prompt and receiving voice data; a payment selection system receiving the payment authorization data and displaying one or more payment accounts for selection by a user, wherein the payment selection system Transmits payment account data to a point-of-sale system, the payment selection system further comprising:

a credit processing interface system providing credit card data to a credit card transaction processing system;

a debit processing interface system providing debit card to a debit card transaction processing system; and an EFT processing interface system providing EFT data to an electronic funds transfer system;

a transaction processing system receiving payment account data after selection of one of the payment accounts; and a point-of-sale system receiving the payment account data from the transaction processing system and providing transaction data to the transaction processing system.

* * * * *